United States Patent [19]

Brekelmans

[11] Patent Number: 4,559,813

[45] Date of Patent: Dec. 24, 1985

[54] SYSTEM AND DEVICE FOR DETECTING THE FORMING OF DEPOT

[75] Inventor: Henricus J. P. M. Brekelmans, Eindhoven, Netherlands

[73] Assignee: IHC Holland N.V., Papendrecht, Netherlands

[21] Appl. No.: 608,881

[22] Filed: May 10, 1984

[30] Foreign Application Priority Data

May 11, 1983 [NL] Netherlands .................. 8301701

[51] Int. Cl.$^4$ ........................................... G01N 31/02
[52] U.S. Cl. .................................... 73/61.4; 250/227; 356/342
[58] Field of Search ............... 73/61.4; 250/227, 574, 250/575; 356/337, 338, 342

[56] References Cited

U.S. PATENT DOCUMENTS

| 3,575,129 | 4/1971 | Sullivan | 116/57 |
| 3,653,767 | 4/1972 | Likowitz | 356/342 X |
| 4,146,799 | 3/1979 | Pitt et al. | 250/574 |
| 4,155,651 | 5/1979 | Malone | 356/342 |
| 4,498,004 | 2/1985 | Adolfsson et al. | 250/227 |

FOREIGN PATENT DOCUMENTS

| 869999 | 12/1978 | Belgium . | |
| 2401322 | 7/1975 | Fed. Rep. of Germany . | |
| 1964388 | 11/1978 | Fed. Rep. of Germany | 356/338 |
| 3117866 | 11/1982 | Fed. Rep. of Germany | 356/338 |
| 6608492 | 12/1967 | Netherlands . | |
| 479478 | 11/1969 | Switzerland . | |
| 1274534 | 5/1972 | United Kingdom . | |
| 1376304 | 12/1974 | United Kingdom | 250/227 |
| 2097529 | 11/1982 | United Kingdom | 356/337 |

OTHER PUBLICATIONS

Instrumental Practice for Process Control and Automation, vol. 24, No. 12, Dec. 1970, United Trade Press Ltd. London (GB) "Granular Material Flow Monitor", p. 840.

Primary Examiner—Charles Hart
Attorney, Agent, or Firm—Young & Thompson

[57] ABSTRACT

System for detecting the forming of depot inside a transport channel for transporting particles in a light transparent carrier fluid, comprising a light transmitter, a light receiver, a bifurcated glass fibre cable of which an end is installed in the wall of a transport channel. One branch of the cable is coupled to the light transmitter and the other branch is coupled to the light receiver, and the output of the light receiver is connected to a discriminator circuit comprising a converter for converting the effective ac voltage component in the received signal into a dc voltage component and a comparator in which the dc voltage signal is compared with a predetermined threshold signal, which discriminator circuit is coupled to a visual indicator unit.

9 Claims, 6 Drawing Figures

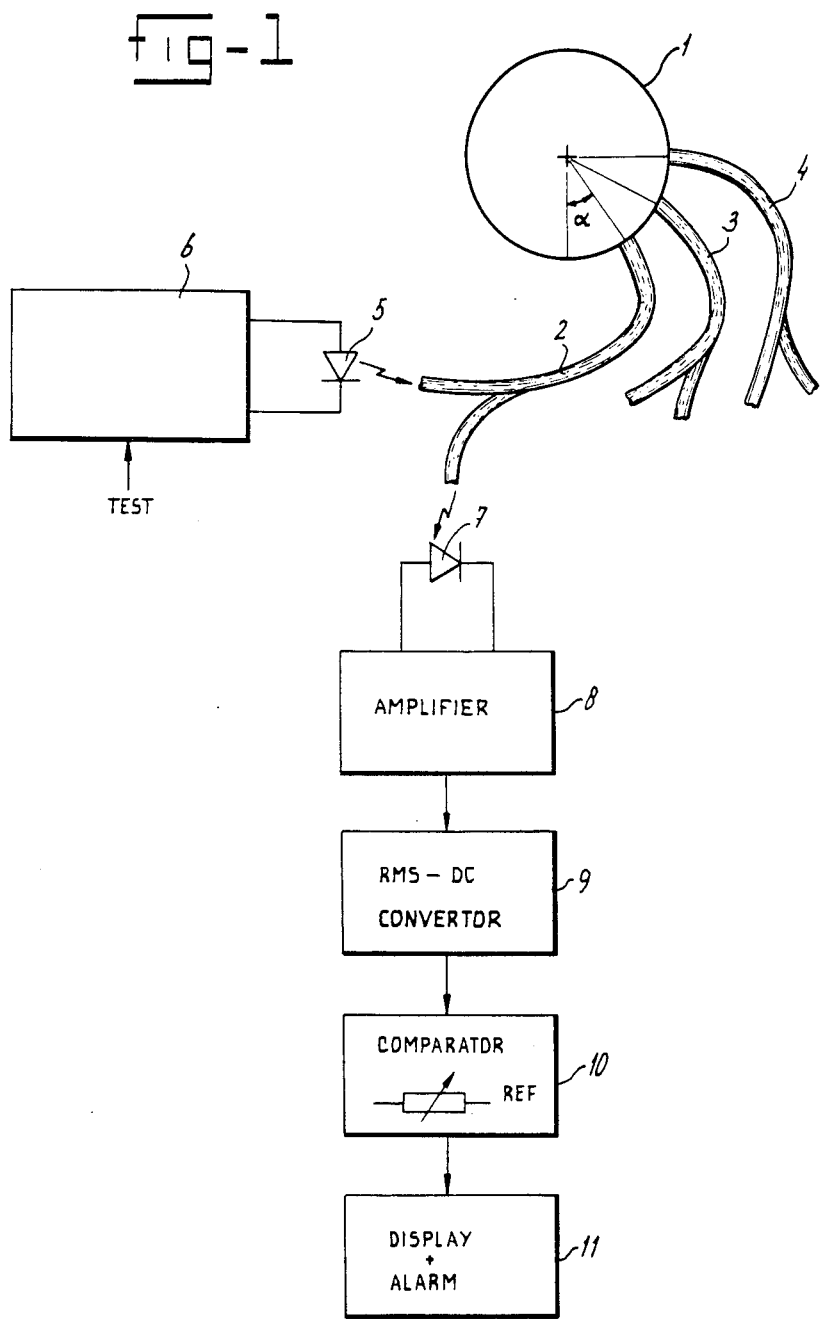

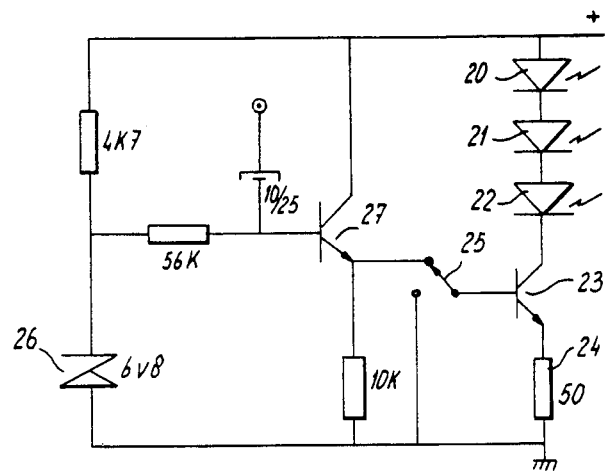
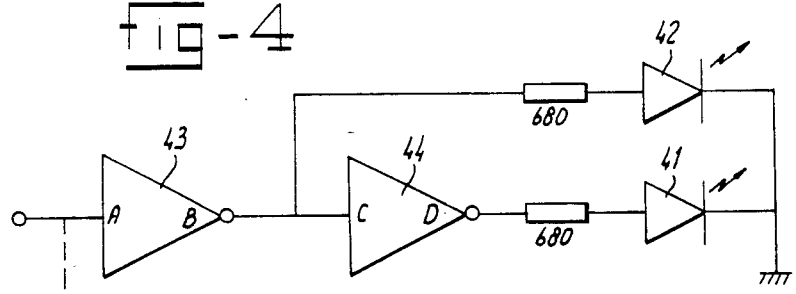
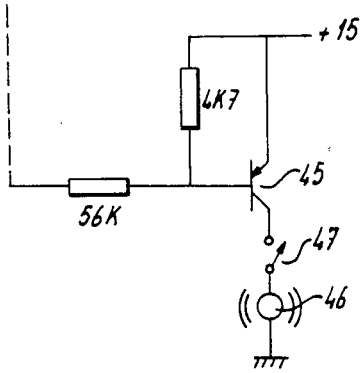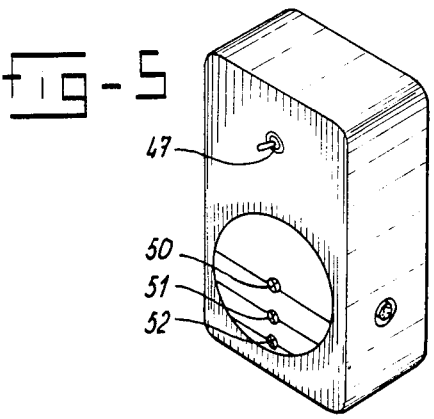

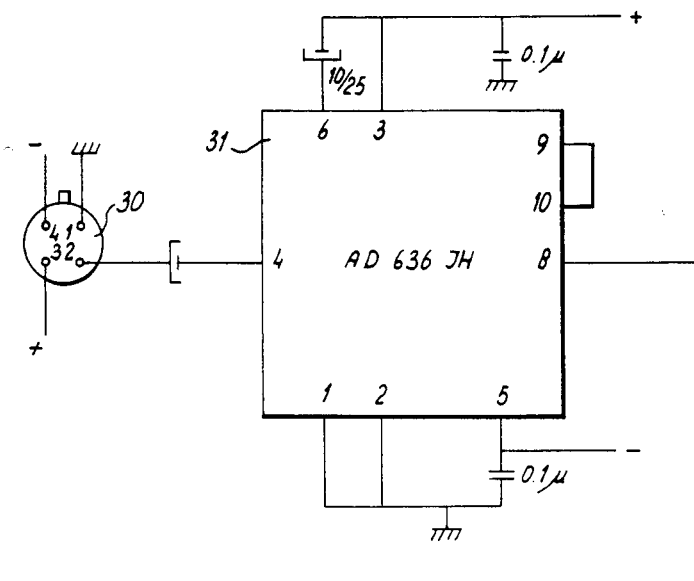
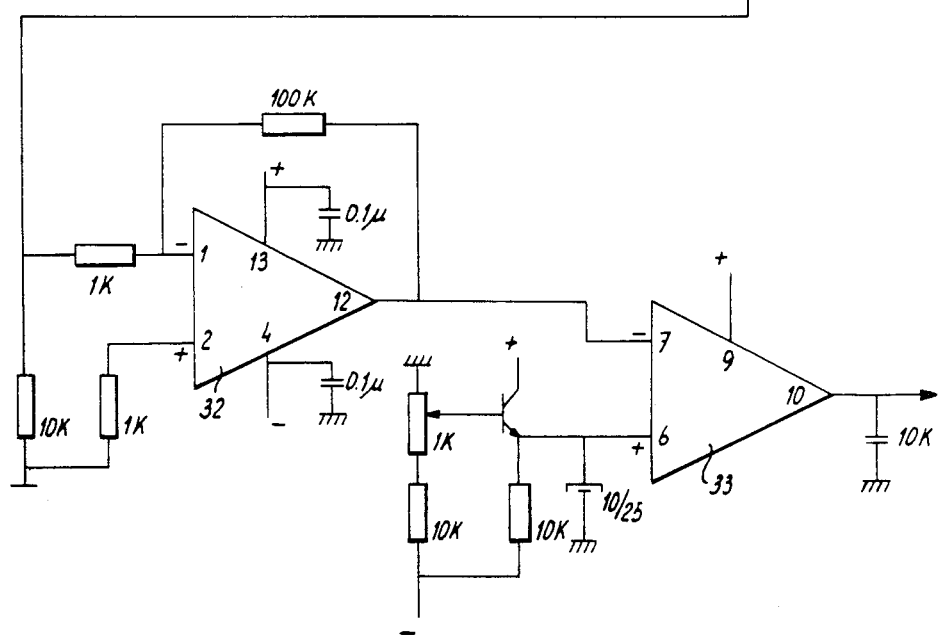
fig-3

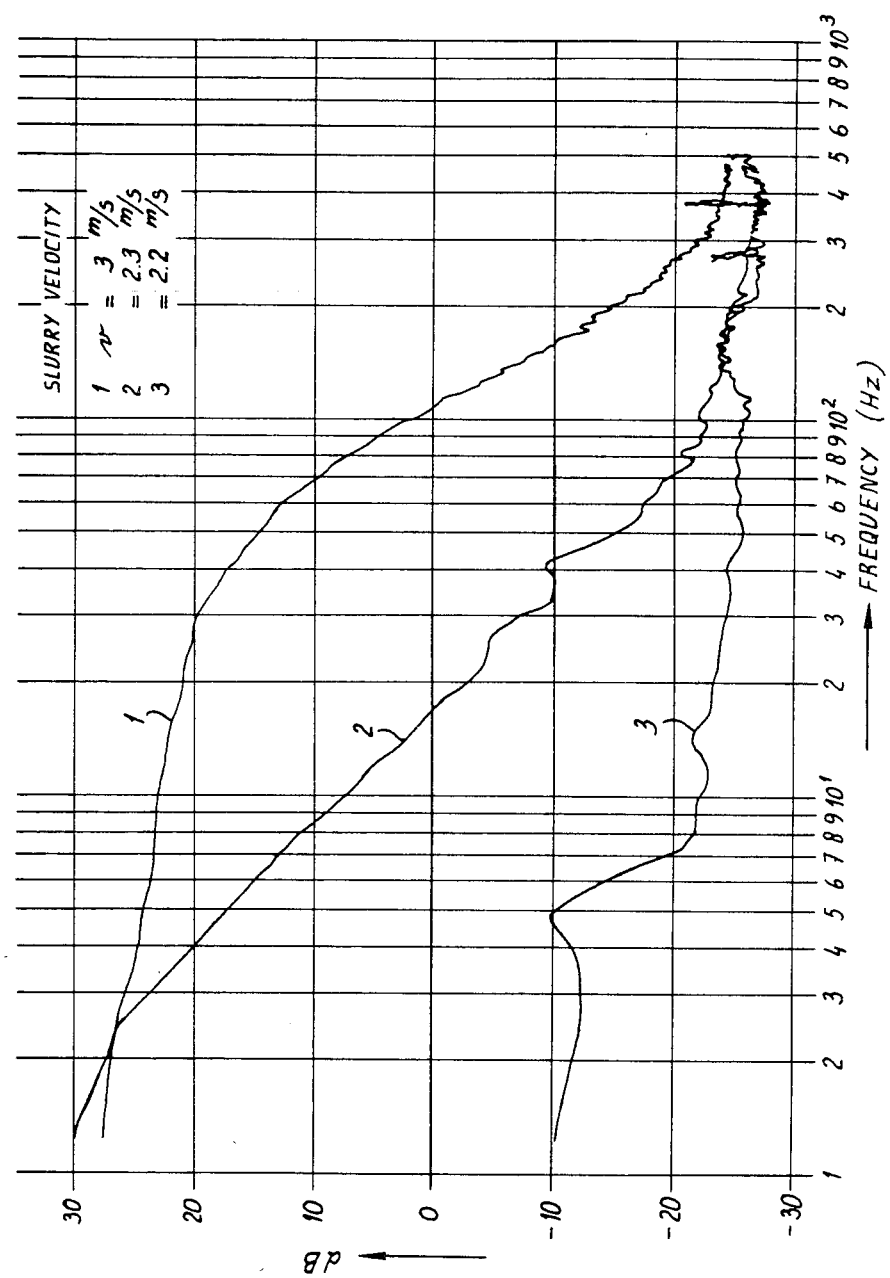

SYSTEM AND DEVICE FOR DETECTING THE FORMING OF DEPOT

The invention relates to a system for detecting the forming of depot inside a transport channel for transporting particles within a light transparent carrier fluid. When transporting particles within a carrier fluid, for instance transporting sand or coal particles within water (slurry) or transporting fibre particles, cereals and other dry substances within pressurized air, one encounters the problem of the forming of depot. Depot forming in a horizontal conduit occurs in case the solid components are starting to settle down within the fluid. The moment this happens depends on the granular composition of the mixture, the concentration of the mixture as well as the velocity of the mixture.

The danger in depot forming is that there is a chance that blockage of the whole conduit will occur with all the thereto related disadvantages. In the dredging field the term sanding is used for this phenomenon. Therefore a dredging master will always maintain a sufficiently large safety margin relative to the danger zone in which the depot will be formed. On the other hand however the conditions for pumping a slurry or in general a multiphase mixture with optimum use of energy are found very near to this zone. That is proven in practice and can furthermore be demonstrated by means of the known velocity-pressure difference-diagrams for transport through conduits. Therefore there exists a distinct need for a reliable device for detecting depot forming into a fluid transport channel.

In a prior art device use is made of ultrasonic waves, the results of which however especially with low transport speeds, are very unreliable. Furthermore in acoustically polluted environments (as will be the case especially with slurry transport of coal and sand) the relatively small measuring signal will disappear within the much stronger noise signal.

The invention now provides a system for detecting the forming of depot inside a transport channel for transporting particles within a carrier fluid, characterized by a light transmitter, a light receiver and a bifurcated glass fibre cable, of which the joint end is installed within the wall of the transport channel, the one branch of the fork is coupled to the light transmitter and the other branch of the fork is coupled to the light receiver, and the output of the light receiver is connected to a discriminator circuit discriminating between signals originating from moving particles within the fluid and signals originating from stationary particles within the fluid.

During the operation of the system the light transmitter will emit light which through the glass fiber cable will be radiated into the carrier fluid. The particles transported within the carrier fluid function as light reflectors and will reflect the light back to the glass fibre cable, so that the light receiver will receive said reflected light. Therefore, at the output of the light receiver an electrical signal will be developed proportionally to the intensity of the reflected light. When the particles in the conduit are not moving, which is the case as soon as a depot is formed, this intensity will be constant. A small displacement of particles is sufficient to create a continuous variation in the light intensity. In that case a varying voltage signal will be delivered at the output of the light receiver which can be discriminated in the discriminator circuit.

The discriminator circuit comprises for instance a convertor for converting the effective ac-voltage component of the received signal into a dc-voltage component, as well as a comparator in which said dc-voltage signal is compared with a predetermined threshold signal. Preferably the output of the discriminator circuit is furthermore coupled to a visual indicator unit. Said visual indicator unit will clearly indicate if the velocity of the particles is above or below a critical velocity, in other words whether or not there is danger that depot forming or even worse complete blockage will occur.

In practice, for instance when transporting sand over large distances, in general relatively large transport channels are used which have to be monitored at several points. In that case it is preferred that the output of the discriminator circuit is connected to a transmitter by which the output signal of the discriminator circuit is transmitted to a corresponding receiver of which the output is coupled to the indicator unit. In this way a number of measuring points can be monitored at one central location.

The output signal of the light receiver will not only have a dc character when depot forming occurs, but furthermore will have a dc character in case only the carrier fluid without particles is moving through the transport channel. To avoid in that latter case an alarm indication through the indicator unit it may be preferred that the discriminator circuit comprise an input to which a signal can be supplied in case the fluid does not contain any particles.

Practice has proven that a reliable detection of depot is obtained in case the joint end of the glass fibre cable is installed within the lower part of the transport channel defined by an angle of ±30° with reference to the vertical direction through the center of the channel.

If a more detailed indication about the rate of depot forming is desired, then within the scope of the invention a measuring system can be used for detecting and measuring the forming of depot inside a transport channel for transporting particles within a carrier fluid, which system is characterized by a number of systems as described above, wherein the joint ends of the respective bifurcated glass fibre cables are installed within the channel wall under respectively various angles with reference to the vertical direction through the center of the channel. Preferably three devices are used installed at the respective angles of 30°, 60° and 90°.

The invention will now be explained in more detail with reference to an embodiment thereof.

FIG. 1 is a schematical view of a system according to the invention.

FIG. 2 is a more detailed diagram of the light transmitter of FIG. 1.

FIG. 3 is a more detailed diagram of the light receiver, amplifier, convertor, comparator and display unit of FIG. 1.

FIG. 4 is a more detailed diagram of the display unit.

FIG. 5 is a perspective view of the display and alarm unit; and

FIG. 6 is a graph of signal level versus frequency.

The block diagram of a system according to the invention, which has been tested in practice, is shown in FIG. 1. At three locations within the wall of a dredging conduit 1 the joint ends of bifurcated glass fibre cables 2, 3 and 4 are installed. One branch of each bifurcated glass fibre cable is connected to a light transmitter and the other branch is connected to a light receiver. In FIG. 1 only the light transmitter and light receiver belonging to glass fibre cable 2 are shown. It will be clear that identical circuits can be used for the other glass fibre cables 3 and 4. The one branch of the glass fibre cable 2 is coupled to the light emitting diode 5 which is controlled by a diode control unit 6. The diode control unit 6, supplies a dc current to the light emitting diode 5 resulting in a continuous light signal transmitted through the glass fiber cable. Furthermore it is possible to apply a test signal (a sinusoidal signal or a noise signal) to the system.

The reflected light, received through the glass fibre cable 2, is directed to the photodiode 7, which converts said light into an electrical signal. Said signal is amplified in the amplifier 8 and supplied to an RMS-DC convertor 9, converting the RMS value of the ac voltage signal into a dc voltage. In the comparator 10 said dc voltage is compared with a reference voltage. If the signal is smaller than the reference signal then a signal of one polarity, for instance a negative signal will appear at the output. If the signal is larger than said reference a signal of the other polarity, for instance a positive signal will appear at the output. The output signal of the comparator is supplied to a display and/or alarm unit 11. Said display unit is used to monitor eventual depot forming and dependent on the embodiment of the system to monitor the height of the formed depot inside the conduit. In the illustrated embodiment of FIG. 1 the display units of the three glass fibre cables can be combined such that a clear insight will be obtained of the height of the depot formed inside the dredging conduit 1.

FIG. 2 shows a detailed diagram of an embodiment of the light transmitter 6 of FIG. 1. Said light transmitter comprises a number of light emitting diodes 20, 21, 22 which together with a transistor 23 and at least one resistor 24 are connected in series between the power supply terminals. The current through said diodes is determined by the base voltage of the control transistor 23 and the resistor 24. Said current can be measured at the emitter of transistor 23. If the dc voltage at said point is 5 V then in this embodiment a current of 100 mA runs through said diodes 20, 21 and 22. The current can be reduced to zero by means of switch 25 connected to the output of the transistor. With the switch 25 in the illustrated position the current will be determined by the zener diode 26. The configuration around said transistor 27 is furthermore conventional and considered as known to the expert.

In FIG. 3 a detailed diagram is shown of the units 7, 8, 9 and 10 of FIG. 1. In FIG. 3 the photodiode 7 is combined with the amplifier 8 into a commercially available device, the integrated photodetector circuit osi-5k supplied by Centronix, which is shown only schematically at 30 in the upper left part of the figure. For details of this device reference is made to the specification thereof.

The output of this detector stage is coupled to the input of the RMS-DC convertor 31 built around the integrated circuit AD636JH. For further details of said integrated circuit and the components used for connecting said circuit reference is made to the specification leaflets of this circuit.

It is remarked that in principle it is possible to use a peak detector. Using a peak detector might have some into advantages because the peak value of the signal is much larger than the effective value. On the other hand however using the integrated circuit AD636 results in a very simple hardware circuit.

The output signal of stage 31 is amplified ×100 in the amplifier 32 in a conventional way. The amplifier is for instance a type 3240 connected as shown in a conventional circuit.

It is remarked that in principle any operational amplifier can be used, the only requirement for said operational amplifier being that the offset voltage has to be low. A large number of operational amplifiers meting said requirement are available on the market.

The output of the amplifier stage 32 is coupled to the input of a comparator stage 33 built around the integrated circuit 3240. The signal at the negative input is compared with the reference voltage supplied to the positive input. Said reference voltage is generated in a usual way by means of an adjustable resistance network and will in this illustrated practical embodiment be equal to 0.5–5 V.

The output of the comparator is connected to the input of a display unit illustrated in FIG. 4, in this case comprising two coloured light emitting diodes, i.e. a green light emitting diode 41 and a red light emitting diode 42. It will be clear to the expert that when the comparator outputs a high signal, in which case there is no depot forming, the green diode 41 will emit light, whereas in the other case the red diode 42 will be activated indicating depot forming. The invertors 43 and 44 in FIG. 4 are of the type 4049.

It will furthermore be clear that the output of the comparator can be coupled also to an alarm circuit, for instance an acoustical alarm circuit, in this embodiment comprising the transistor 45, some resistors and the sound generator 46, which can be switched off by switch 47.

FIG. 5 illustrates a practical example of the display and alarm unit in which the LED's for detecting systems functioning at different heights inside the conduit are combined providing a clear visual indication of the eventual depot forming. In each point 50, 51 or 52 the respective red and green LED's are combined and the "height" of the row of red emitting points 52, 51, 50 indicates the "height" of the eventual depot in the measuring zone.

The depot detection system according to the invention can be installed permanently in a complete pipe section which in a very simple way can be installed at any place in a transport conduit. Thereby it is possible to select the diameter of said pipe section somewhat larger than the diameter of the transport conduit. The result thereof is that within said measuring section there is more chance that depot will be formed and thereby a kind of safety margin is created in case said section is installed in a relatively long pressurized conduit.

Because the complete circuit has only a very low energy consumption it is possible to use a very simple transmit and receive installation for transmitting information from one or more measuring points to a central receiver station in which all measuring points are monitored.

A prototype of the circuit was tested in a transport conduit for transporting a slurry of water and coal particles. The reference voltage was adjusted to 1 V. If there is no depot formed within the conduit then the response is dependent onto the type of glass fibre cable in the range of 6–20 V and said output voltage is practically independent of the particle velocity within the channel, provided said velocity is above the critical velocity whereby the forming of a depot starts. When the particles within the conduit do not move anymore, in other words if depot forming has occurred, then the signal at the output of the RMS-DC convertor is only 0.3–0.4 V, which together with the selected reference voltage results in a very clear detection criterion.

FIG. 6 illustrates graphically the results obtained with the prototype circuit. The joint end of the bifurcated fibre cable was installed in the bottom part of the pipe conduit.

Curve 1 illustrates the situation at a slurry velocity of $v=3$ m/s. No depot is formed.

Curve 2 illustrates the situation at a slurry velocity of $v=2.3$ m/s. There is some depot forming, however, the whole depot is still moving as a kind of floating bed. As is clearly shown the share of the intermediate frequencies between $\pm 10$ and 100 Hz is clearly decreased.

Curve 3 illustrates the situation at a slurry velocity of 2.2 m/s. The formed depot is almost stationary and the amplitude of all frequencies is strongly decreased.

As will be clear from this illustration it is preferred to insert a filter in the circuit ahead of the convertor, which filter is for instance a band pass filter with a pass band between 10 Hz and 100 Hz enabling a discrimination between the situations illustrated by the curves 1, 2 and 3. In combination with such a filter the indicator unit can be adapted to indicate signals within predetermined frequency ranges to get a visual indication of the situations (1) no depot, (2) some moving depot, or (3) a stationary depot.

Although in the above description reference is made to glass fibre cables it will be clear to the expert within this field that also optical fibre cables manufactured from materials other than glass can be used within the scope of the invention. It will furthermore be clear that the detailed diagrams illustrated in the figures have to be considered only as examples and that many other embodiments, within reach of the expert, can be used instead.

I claim:

1. System for detecting the forming of depot inside a transport channel for transporting particles in a light transparent carrier fluid, comprising a light transmitter, a light receiver, a bifurcated glass fibre cable of which the joint end is installed within the wall of a transport channel, one branch of the cable fork being coupled to the light transmitter and the other branch being coupled to the light receiver, and the output of said light receiver being connected to a discriminator circuit comprising a convertor for converting the effective ac voltage component in said received signal into a dc voltage component and a comparator in which said dc voltage signal is compared with a predetermined threshold signal.

2. System according to claim 1, in which the output of the discriminator circuit is coupled to a visual indicator unit.

3. System according to claim 1, in which the output of the discriminator circuit is connected to a transmitter for transmitting the output signal of the discriminator circuit to a corresponding receiver of which the output is coupled to said indicator unit.

4. System according to claims 1, in which the discriminator circuit comprises an input on which a signal can be supplied in case the fluid does not contain any particles.

5. System according to claim 1, in which the conduit section of the transport channel in which said joint end of the bifurcated glass fibre cable is installed has a somewhat larger diameter than the remaining sections of the transport channel.

6. System according to claim 1, in which the joint end of the glass fibre cable is positioned within the lower part of the transport channel defined by an angle of $\pm 30°$ with reference to the vertical direction through the center point of the channel.

7. Measuring system for detecting and measuring the forming of depot inside a transport channel for transporting particles in a carrier fluid, comprising a number of systems as described in claim 1, in which the joint ends of the respective bifurcated glass fibre cables are installed within the channel wall at respective different angles with reference to the vertical direction through the center point of the channel.

8. Measuring system according to claim 7, in which three of the above described systems are used and the applied angles are respectively 30°, 60° and 90°.

9. Measuring system according to claim 7, in which ahead of the convertor a filter is inserted in the circuit for transmitting only a predetermined frequency range and the indicator unit comprises means for indicating signals within predetermined amplitude ranges.

* * * * *